(12) United States Patent
Chen et al.

(10) Patent No.: US 11,301,360 B2
(45) Date of Patent: Apr. 12, 2022

(54) SYSTEM AND METHOD FOR USING AN UNOBTRUSIVE AND DISCRETE EMBEDDED BARCODE FOR DEBUGGING

(71) Applicant: PAYPAL, INC., San Jose, CA (US)

(72) Inventors: Sherman Chen, San Francisco, CA (US); Derek Anderson, San Jose, CA (US); Siddharth Reddy Malkireddy, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/107,801

(22) Filed: Nov. 30, 2020

(65) Prior Publication Data

US 2021/0224182 A1 Jul. 22, 2021

Related U.S. Application Data

(63) Continuation of application No. 16/025,625, filed on Jul. 2, 2018, now Pat. No. 10,891,215.

(51) Int. Cl.
*G06F 9/44* (2018.01)
*G06F 11/36* (2006.01)
*G06K 7/10* (2006.01)
*G06K 19/06* (2006.01)

(52) U.S. Cl.
CPC ........ *G06F 11/3636* (2013.01); *G06F 11/366* (2013.01); *G06K 7/1095* (2013.01); *G06K 19/06103* (2013.01); *G06K 19/06178* (2013.01)

(58) Field of Classification Search
None
See application file for complete search history.

(56) References Cited

U.S. PATENT DOCUMENTS

| | | | | |
|---|---|---|---|---|
| 5,561,763 A * | 10/1996 | Eto | ................... | G06F 11/362 714/35 |
| 6,378,125 B1 * | 4/2002 | Bates | ................. | G06F 11/3664 717/138 |
| 2006/0080336 A1 | 4/2006 | Zhang et al. | | |
| 2012/0006894 A1 * | 1/2012 | Pruden | ............. | G06K 19/06037 235/454 |

(Continued)

OTHER PUBLICATIONS

International Appl. No. PCT/US2019/040426, International Preliminary Report on Patentability dated Jan. 14, 2021, 7 pages.

(Continued)

*Primary Examiner* — Qamrun Nahar
(74) *Attorney, Agent, or Firm* — Haynes and Boone, LLP

(57) ABSTRACT

Aspects of the present disclosure involve systems, methods, devices, and the like for generating an unobtrusive and discrete barcode used for debugging. In one embodiment, a system is introduced that enables the tracking of application interactions on a user device. The tracking can include the generation of a debug id which can include a discrete string used to describe locations, preferences, and interactions with a user device application. The string may then be converted into a corresponding barcode which can be discretely displayed on the user interface of the application. In another embodiment, the barcode may be captured and/or retrieved for use in debugging the application, in an instance where an application malfunction is encountered.

17 Claims, 7 Drawing Sheets

(56) References Cited

U.S. PATENT DOCUMENTS

2012/0229312 A1* 9/2012 Cheon ................. H03M 7/3088
                                                        341/87
2016/0140429 A1* 5/2016 Glosser ............ G06K 19/06037
                                                        702/185

OTHER PUBLICATIONS

International Appl No. PCT/US2019/040426, International Search Report and Written Opinion dated Sep. 23, 2019, 7 pages.

* cited by examiner

SYSTEM AND METHOD FOR USING AN UNOBTRUSIVE AND DISCRETE EMBEDDED BARCODE FOR DEBUGGING

RELATED APPLICATIONS

This application is a continuation of U.S. application Ser. No. 16/025,625, filed Jul. 2, 2018 and entitled, "System and Method for Using an Unobtrusive and Discrete Embedded Barcode for Debugging," which is incorporated herein by reference in its entirety.

TECHNICAL FIELD

The present disclosure generally relates to interactions with an electronic device. In particular, the present disclosure relates to debugging issues that may arise in connection with usage of the electronic device.

BACKGROUND

Electronic devices are prevalent in our society today. They are used for a variety of purposes, such as, for example, enabling communications between people, playing video games, conducting online shopping, and facilitating electronic payment transactions. Electronic devices have also become multimedia computing platforms with integral digital cameras for taking pictures and videos, playing music, recording conversations, and organizing and planning activities and appointments. However, the electronic device may, at times, suddenly, randomly, and unexpectedly freeze, stall, shutdown, exit, encounter an error, or otherwise malfunction during any of these activities. In those cases, the user may not necessarily be aware of the reason(s) why the electronic device malfunctioned. Such malfunction can lead to loss of time, money and frustration to the user. Therefore, it would be beneficial if a system and method are created with the ability to debug such electronic device malfunction.

Figure 1B:
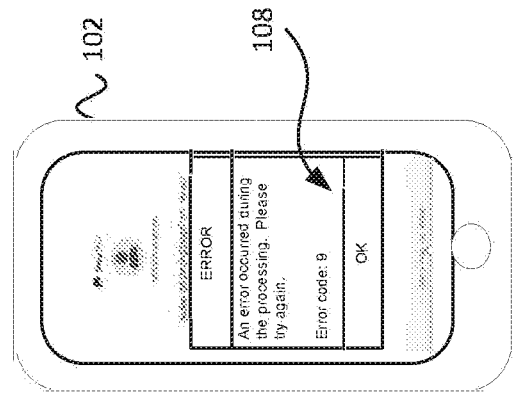
FIGS. 1A and 1B illustrates block diagrams of user device malfunction.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for generating an unobtrusive and discrete barcode used for debugging. In one embodiment, a system is introduced that enables the tracking of application interactions on a user device. The tracking can include the generation of a debug id which can include a discrete string used to describe locations, preferences, and interactions with a user device application. The string may then be converted into a corresponding barcode which can be discretely displayed on the user interface of the application. In another embodiment, the barcode may be captured and/or retrieved for use in debugging the application, in an instance where an application malfunction is encountered.

Rapid advances in communications have made portable electronic devices, such as smartphones and tablets, part of everyday life. Among other things, these electronic devices can be used to browse the web, stream video, and purchase goods and services. In some instances, one or more electronic devices can be used to make the purchase or perform other transaction. However, in some of those user interactions, a user may loose access to the application due to a device or application malfunction. For example, a user may be in the process of making a purchase and during checkout, the application may freeze. As another example, a user may be in the process of communicating with another device via a messaging application and during the communication, loose connection due to an error. Still in another example, a user may be trying to access a specific website which may not load correctly due to a bug. In such instances, tracking and correcting the malfunction may not be possible.

Conventionally, electronic devices such as laptops, computers, and the like use tokens or cookies for debugging purposes. However, debugging user application issues on a user device (e.g., mobile device) may be more difficult due to lack of context involved in the user's situation and/or inability to track using a token. Further, trying to understand the error or malfunction may be difficult base on the user's literacy and communication with technical support.

Figure 1A:
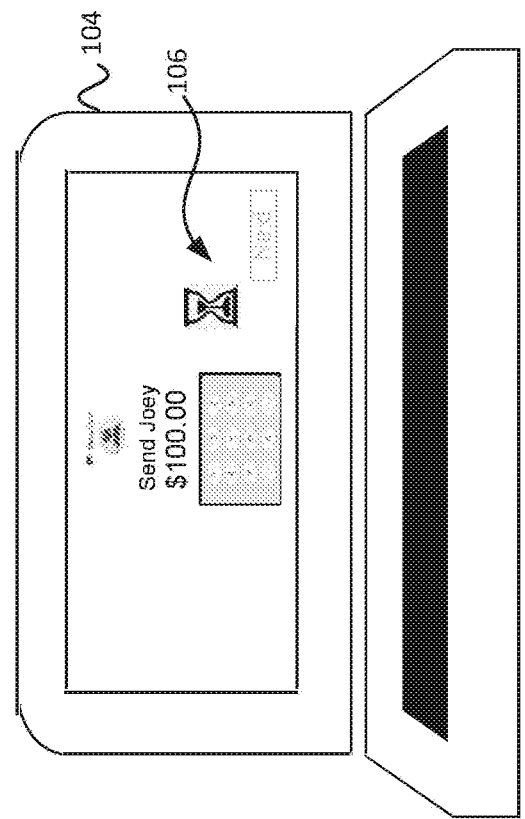

For example, consider FIGS. 1A and 1B. As illustrated, FIG. 1A presents a laptop or similar electronic device 104 which has encountered a malfunction. The electronic device 104 may be, for example, a tablet, laptop, pc, or the like. For exemplary purposes, electronic device 104 can be a laptop as illustrated in FIG. IA Generally, electronic device 104 can be used for numerous tasks including but not limited to web browsing, video streaming, bill pay, and purchase of goods and services. FIG. 1A illustrates an electronic device 104 where a user is interacting with an application for performing a monetary transfer. In this interaction, an error 106 has been encountered and the transaction was not completed because the application froze. As indicated, such error 106 on an electronic device could be resolved and identified using cookies. Additionally, if this was processed on a web application, technical support could request information captured on the website URL containing a token which could be used to identify the error 106. However, if an error was instead encountered while using a user device 102 (e.g., smart phone), identifying the error would be more difficult.

The user device 102 may be a tablet, iPad, cell phone or the like. For exemplary purposes, user device 102 can be a smart phone. The smart phone may be equipped with various applications for performing similar tasks as indicated with electronic device 104. For example, the user device 102 may be used for web browsing, video streaming, bill payments, and online purchases. Additionally, the user device 102 be equipped with applications that enable the user to make purchases using a payment provider application and/or a digital wallet. Further, the user device 102 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 102 can be used to make a purchase for a good or service using an application or digital wallet. For example, consider FIG. 1B illustrates a user interacting with an application for making a monetary transaction. As illustrated, an application error 108 is encountered which blocks the transaction from occurring. Instead an error message is encountered with a code and not much else which could tell the user what the issue is. Additionally, neither a token or URL are available to the user (as was the case with the electronic device), which could be used and provided to technical support for error resolution and thus the lack of context involved in resolving the application error 108. Thus, such lack of context can lead to added time, delay in transaction completion, and frustration by the user.

In a current embodiment, a system and method are introduced which present the use of a discrete and unobtrusive embedded barcode on a UI display of an application running on the user device 102 for debugging. In particular, the current embodiment introduces the embedding of a hidden barcode maintained on each screen/page of an application to provide a solution that requires minimal user interaction and may be used for debugging.

Figure 2:
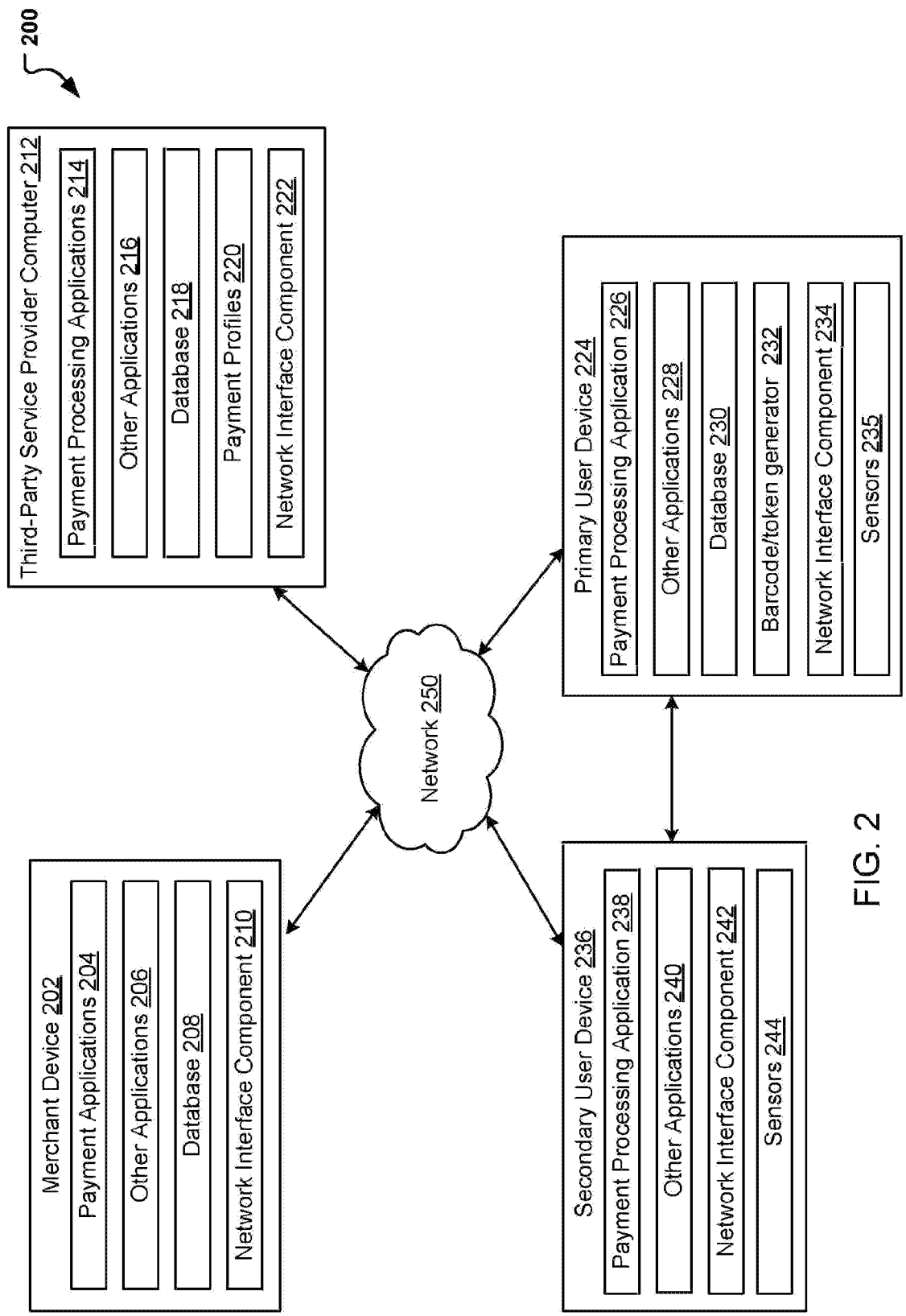
FIG. 2 illustrates a block diagram of a system for performing transactions.

As indicated, the application error may be encountered while using a mobile application which may be associated with a secondary user, third party provider, or even merchant. As such, FIG. 2 is introduced which includes the communication and interactions possible between multiple users and/or devices including but not limited to a primary user, secondary user, third party provider, and/or merchant. Therefore, FIG. 2 is a block diagram of a networked system 200 for implementing the processes described herein, according to an embodiment. In particular, FIG. 2 illustrates a block diagram of a system 200 for completing transactions and interacting with an application. System 200 illustrates at least some of the interactions between multiple entities and/or devices for the authentication, use and purchase of a product or service with a merchant in association with a service provider. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant device 202, a primary user device 224 (e.g., user device 102), a third-party service provider computer 212, and a secondary user device 236 (e.g., electronic device 104) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information. For example, the other applications 206 may include a graphical user interface (GUI) configured to provide an interface to the user and enable the use of one or more features for completing transactions between marketplaces.

The merchant device 202 may further include a database 208, which may be stored in a memory and/or other storage device of the merchant device 202. The database 208 may include, for example, identifiers (IDs) such as operating system registry entries, cookies associated with the payment application 204, tokens, encryption keys, and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, Calif., USA Alternatively, the third-party service provider computer 212 may be associated with a user of the user device 102 and/or personal device 104. As such, the third-party service provider computer 212 includes one or more payment processing applications 214, which may be configured to process payment information received from the merchant device 202 or from a selection at the user device 102 and/or personal device 104. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device 102 associated with the merchant. The payment code can be scanned or transmitted to the merchant device 202 for payment processing. Still in another example, the payment provider may include an icon that may be squeezed, swiped, tapped, or other for the processing of a transaction.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APis over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users (including gestures).

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

Still in other embodiments, the third-party service provider may include any provider whose application may be used and installed on the primary user device 224. The third-party service provide may also include at least a token generation module or barcode embedding module which is installed and used by the primary user device 224 for debugging an error encountered on the third-party service provider application.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a smart phone, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be user device 102 communicating with personal device 104, a merchant device and/or service provider 212.

The primary user device 224 may include a payment processing application 226 that may be used as a digital wallet that can communicate with a merchant device 202, secondary user device 236, and/or third-party service provider 212 for purchasing and transacting. The payment processing application 226, can work jointly with database 230 for retrieving bank account information, user accounts, security codes, tokens that may be associated with various merchant locations. Similarly, the payment processing application, or other application on the primary user device 224 can also include a barcode embedding/token generating module 232 which can be used to maintain an active capture of the session and information associated with the application session and/or application error encountered by the application.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site searches (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include user identifier information which can be used in conjunction with secondary user device 236 during an explicit code exchange and/or contextual information for web browser authentication. Further, the database 230 may include user selected gestures for the authentication, and processing of transactions.

Primary user device 224, can also be equipped with various sensors 234 to provide sensed characteristics about the primary user device 224 and its environment. For example, the sensors 234 can include a camera for taking images of the surroundings used to determine the information to provide a user (e.g., camera used for scanning a QR code or scanning a user eye/pupil or other biometric). As another example, the sensors 234 can include microphones for receiving audio signals which can be used to detect location, and other relevant terms that may be spoken. Further, the sensors 234 can include an accelerometer, a light sensor, a biometric sensor, temperature sensor, etc. For example, the biometric sensor can be used to collect a user fingerprint scan. Each type of sensor providing various characteristics about the device, user, or environment.

The primary user device 224 may also include at least one network interface component 210 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., personal device 104) may be presently available and used by a consumer (e.g., user). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket), biometric data (is user working out), location (user is in a meeting, call received), etc. Further, the sensors 244 can also be used to determine proximity between devices and location of interest as well as determine processor usage and/or signal strength which may be used to characterize the device for determining the interaction state of the secondary user device 236.

Figure 3:
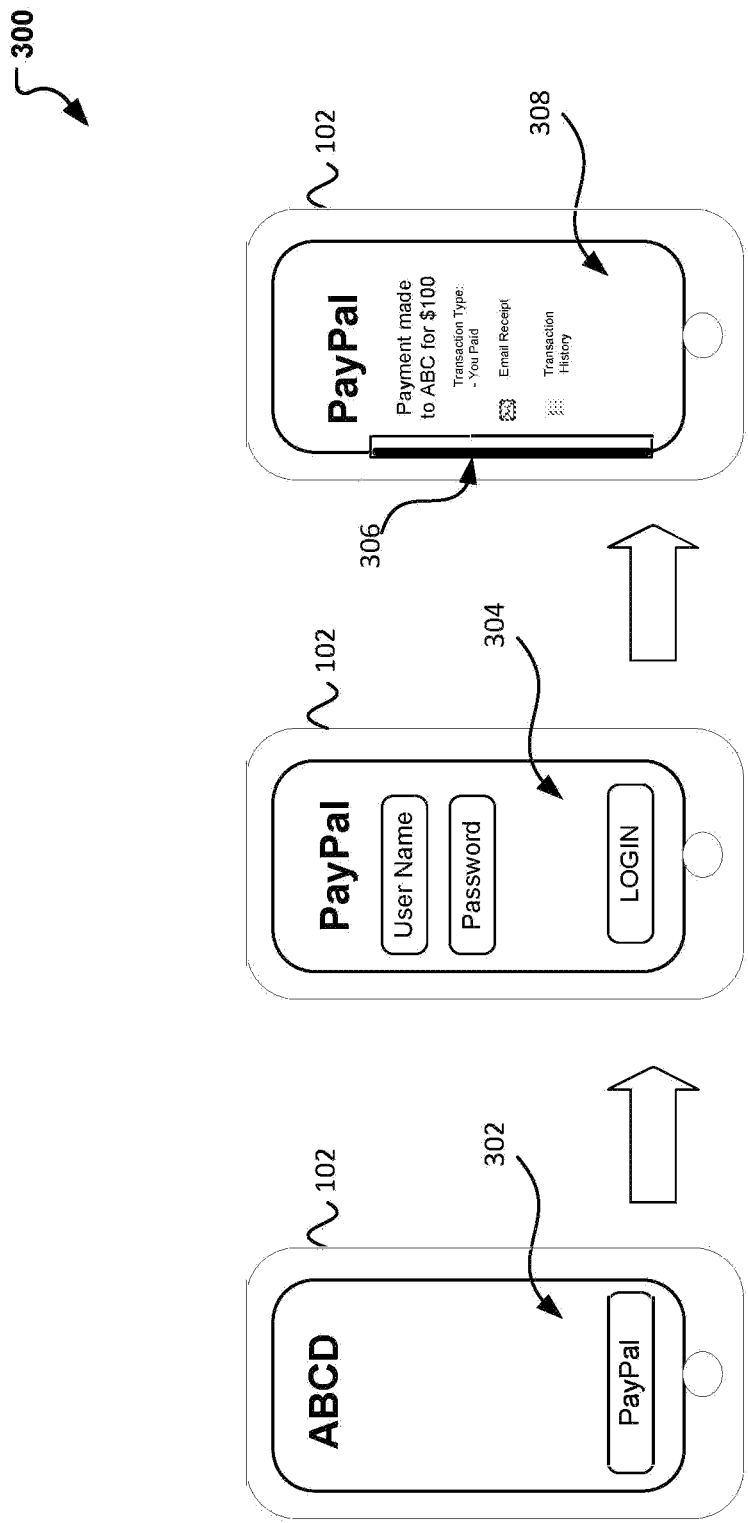
FIG. 3 illustrates a communication for enabling and debugging a user device malfunction using an embedded barcode.
Figure 4:
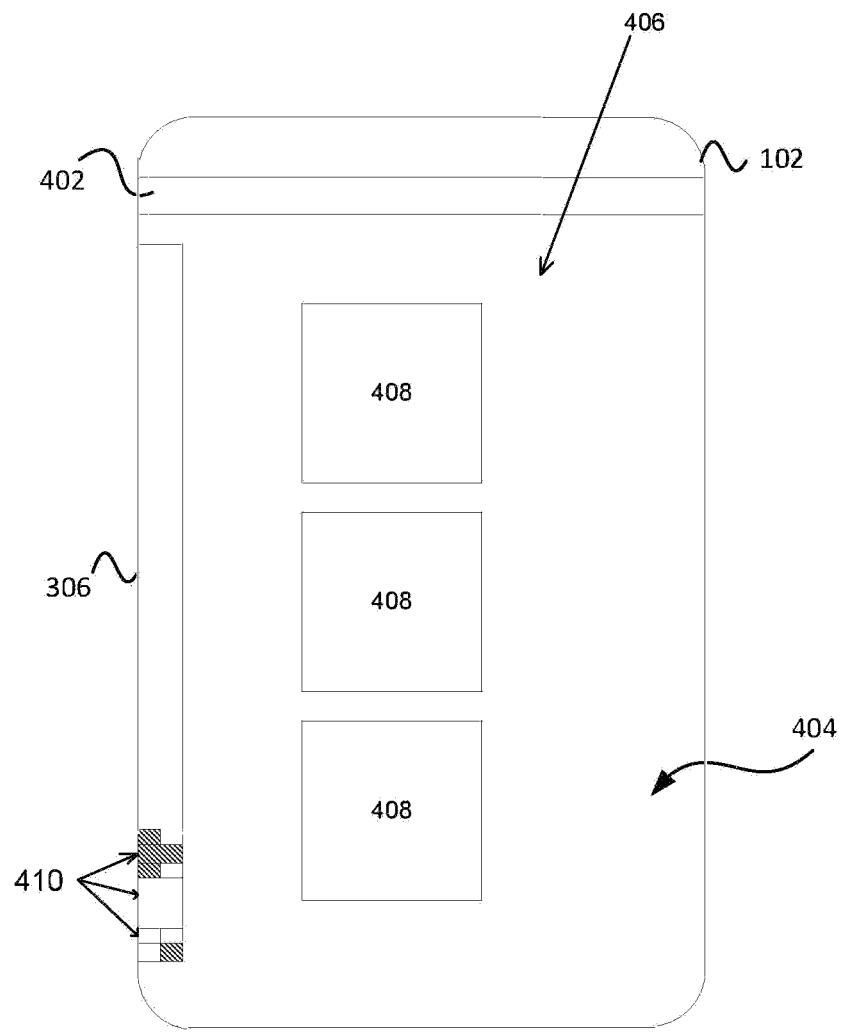
FIG. 4 illustrates an exemplary embedded bar code for debugging a user device malfunction.

Turning to FIG. 3, a diagram is introduced which illustrates the use of an application and debug barcode which is generated using system 200. In particular, FIG. 3 illustrates a communication for enabling and debugging a user device malfunction using an embedded barcode. For exemplary purposes, FIG. 3 generally illustrates a diagram of a user device 102 participating in a transaction and encountering an error which is captured by an embedded barcode. FIG. 3 begins with the user device 102 first participating in a checkout experience. As illustrated, the user device is at a merchant site ABCD with the capacity to use one of a plurality of third service providers 302 for payment. As an example, PayPal is used for the payment of the transaction. However, other payment options may be possible such as through, EFS, credit card, third party financial service provider, merchant card, etc.

Generally, upon selection of the payment service, the user may be prompted to login to their account. For example, if PayPal was selected as the payment option, upon selection of it as a payment instrument, the user may be redirected to a user interface 304 associated with PayPal for login and password information. As the user is authenticated, the corresponding PayPal UI may next be presented to the user with information associated with the transaction to be completed. Concurrently, a unique token and barcode 306 may be generated to track the user interactions with the UI during the transaction. Such barcode 306 may be lined into the user experience, as a portion of the user interface such that it remains discrete and unobtrusive to the user. The embedded barcode 306 can thus efficiently store the user's payment token and also any session information. The session information can be maintained via the use of a debugging identification number (e.g., debug-id), which can be used to trace user interactions throughout the stack. Each system in the interaction can use the debug-id to trace the session during a transaction and use the debug-id for retrieving the session during debug. Thus, if the transaction failed, the screen froze or the application encountered another error, the session and error can be retrieved and captured via the use the barcode.

For example, considering FIG. 3, the transaction was processed and payment was made for $100 to merchant ABCSD. However, if the session froze upon request to checkout, during a request to email receipt, check transaction history, or other error was encountered, at the PayPal checkout UI 308, the barcode 306 could be captured and used for debug. In one embodiment, the barcode 306 can be captured using a screen shot, picture, or via automatic retrieval by PayPal technical support. Thus, the user may simply take a picture with attachment of the barcode and then have it used to determine the error while only requiring minimal user engagement. In turn, PayPal (or other application) support can decode (via a decoding module) and retrieve the user's session.

Note that although an embedded barcode is illustrated and exemplified throughout the application, the debug code is not so limited. Alternatively, the debug code can be in the form of an image, banner, QR code, color scheme, dots, dashes, and the like which can be used to embedded and track a user session and error and for use in debug.

Figure 5:
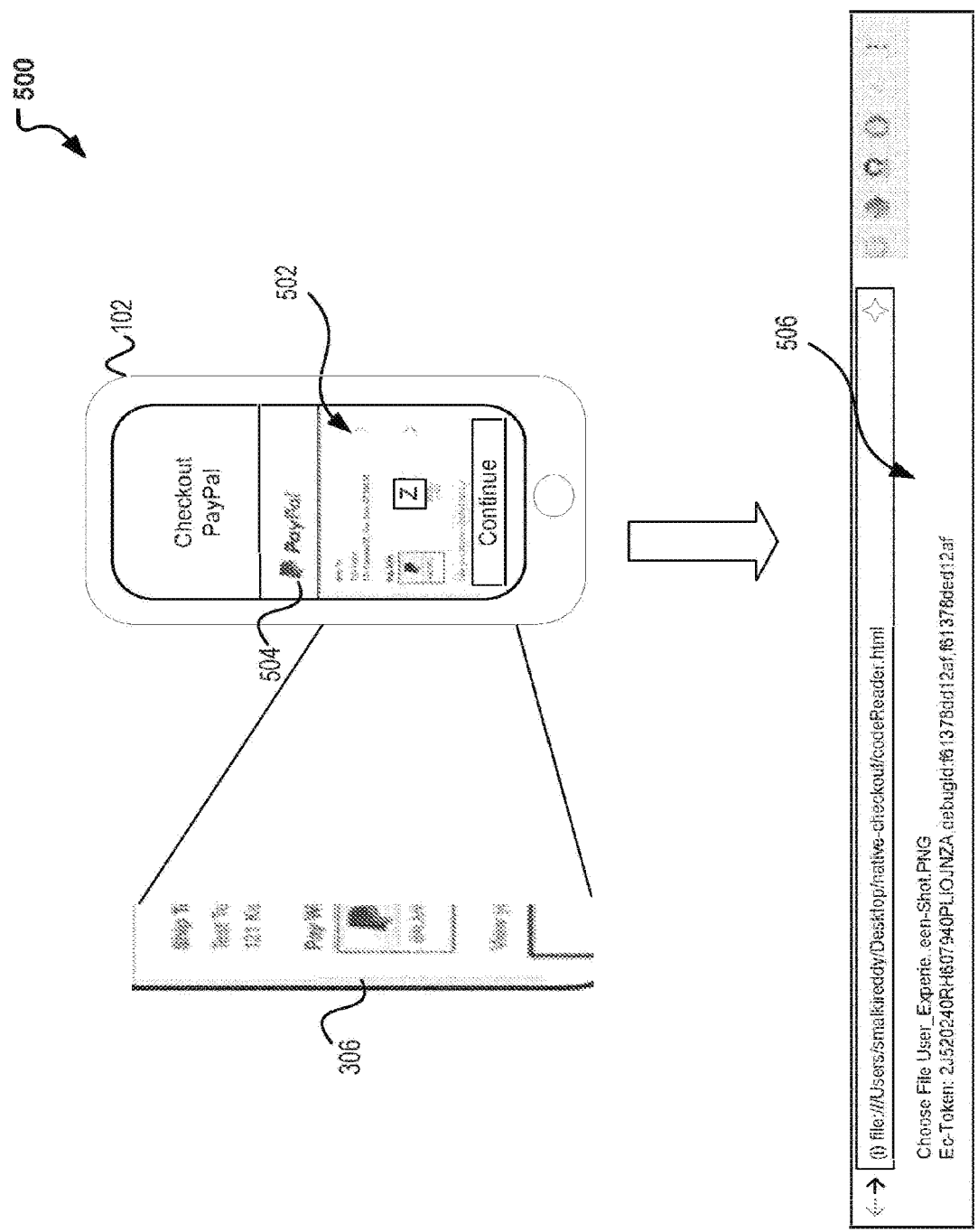
FIG. 5 illustrates another communication for enabling and debugging a user device malfunction using an embedded barcode.

Turning to FIG. 5, an exemplary user device 102 is presented illustrating an embedded barcode for debugging a user device malfunction. In particular, a user device 102 is illustrated with a detailed view of the embedded barcode 306. As illustrated, a user device 102 can be used to track an application transaction and further to help in the identification of an error encountered during application use. As an example, consider user device 102 participating in a checkout transaction as discussed above and in conjunction with FIG. 3. Here, the user device 102 is illustrated during a transacting phase with an application 406 via an application user interface (UI) 404. The application 406 can include one or more options 408 for performing an action. For example, options 408 can include the option to pay, send a monetary request, email a receipt, view transaction history, etc. These options 408 and selection of the option can be assigned a session information code or debugging id used to track a user through a transaction or series of interactions with an application in order to understand where the user was and where the error encountered. In the instance where a transaction is being processed a transaction token can also be generated and embedded into the embedded barcode 306.

In one embodiment, the embedded barcode 306 may be generated by first acquiring the corresponding debug id and token associated with the user session. The debug id and token may be presented to the front-end from an API call and can take the form of a string. For example, the front-end may receive a string that takes the from EC-1234ASFASFSFS-FEEEFF#101212. This string will then be converted such that it can be represented as a barcode 306 (or other format). In one embodiment, the string conversion can occur by converting the string received into a binary code by mapping the characters, letters, and numbers of the string to various color schemes. For example, a designer may choose a color palette that can be used to represent one of three states. Such states can include the use of the particular color by on, off, or none. Thus, each portion of the captured string can be encoded into a message using one of the three colors to represent the entire string and converted into the binary scheme. Therefore, in the conversion scheme, for example, on may be mapped to 1, off to a 0, and none to an empty slot. Consequently, the 1's and O's are mapped to the on and off colors (e.g., 01001100110001100 01010101 00110011) as indicated by the designer and color scheme to create a barcode 306 with geometric patterns 410 created by the color patterns corresponding to the received string.

Alternatively, a similar coding scheme may be used using single pixels, dots, part of an image, a QR code, a picture, video, on a logo, using stenography or the like. Further, in addition to a debug-id and token, session information, interactions with the application, account activity, items on a shopping cart, and the like may also be discretely embedded within barcode. Still further, an expressed checkout token may be contained to regenerate a card used, a partial transaction processed, etc. and checkout completed upon capture and session restore from the embedded barcode. As indicated, the session and token may be captured screen shot, text, customer service/tech support pull from the user device, automatic store on a user device or store in a designated folder on the user device.

Turning to FIG. 5, an exemplary embedded barcode generation and retrieval 500 is illustrated for tracking and debugging an error encountered on a user device 102. In particular, FIG. 5 illustrates another communication for enabling and debugging a user device malfunction using an embedded barcode. As illustrated, a user may be in communication with a third-party service provider and/or interacting with an application. The interactions with the application can be recorded or tracked using a debug ID and/or token 506 which can be converted and embedded as a barcode 306. The interactions, as previously indicated, can include text messaging, browsing on a merchant site, a video communication, a transaction checkout, etc. Illustrated on user device 102, is a checkout user interface 502 with an exemplary third-party service provider (e.g., PayPal), wherein a user is about to purchase and have an item shipped to a specified location. At the checkout user interface 502, the user may encounter various windows or sites within a stack where a user is making selections with regards to item to purchase, quantity, shipping address, payment instrument etc. These selections may be recorded an updated as a user navigates through the application. Such selections and payment information are then retrievable as encoded on the unobtrusive and discrete barcode 306.

As illustrated in retrieval in the barcode generation and diagram 500, the embedded barcode 306 is unnoticeable and can provide the information generally tracked by cookies on a computer but often not available on a user device 102. Thus, a technical support representative is able to obtain the barcode (via user capture or automatic retrieval) and decode the token and debug id 506 as illustrated in FIG. 5. From the token and debug id 506, the error encountered, interactions completed by the user, and instance where error occurred can be determined and more easily resolved. For example, if an error occurred at checkout user interface 502, shipping information, payment device, items on the shopping cart, etc. could be retrieved, and transaction completed. Further, user authentication and authorization may also be stored and automatically re-authenticated upon resolution of the error, such that the user device 102 latest state may be restored.

Note that further to the use of an embedded barcode 306, the token and debug id may also be embedded on to a logo 504, on a banner, in a picture, on the background, using a QR code, image, stenography or the like. In addition, further to the real-time capture of the user token and debug id, other relevant information may be stored and contemplated.

Figure 6:
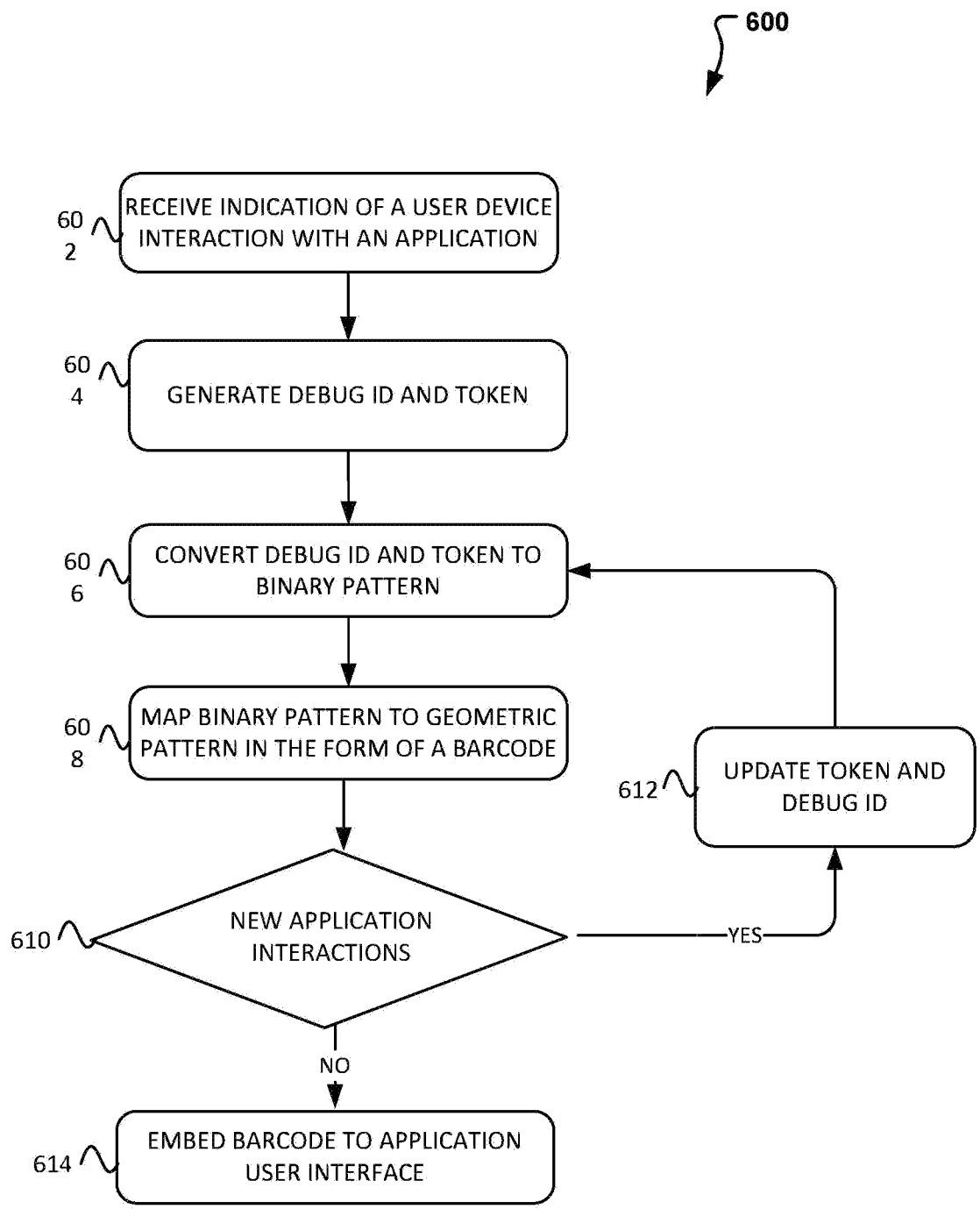
FIG. 6 illustrates a flow diagram of a method debugging using an unobtrusive and discrete embedded barcode.

To illustrates how system 200 generates the unobtrusive and discretely embedded barcode, FIG. 6 is presented to illustrate an example process 600 for generating such barcode. In particular, FIG. 6 illustrates an example process generating and tracking an application state. According to some embodiments, process 600 may include one or more of operations 602-614, which may be implemented, at least in part, in the form of executable code stored on a non-transitory, tangible, machine readable media that, when run on one or more hardware processors, may cause a system to perform one or more of the operations 602-614.

Process 600 begins with operation 602, where a user is interacting with a user device and an indication is received by a service provider of an application on the user device that the user is interacting with the application. The indication may be received in response to the opening of an application on the user device, a redirection from a merchant site or other marketplace to the application for checkout, or a direct usage of the application via a selection of one or more options available on the application itself As the application is being used, at the service provider site and/or locally at the user device, a debug id (and optionally a token) is generated as a means for tracking user interactions with the user device, at operation 604. The token which may also be generated can be an authentication toke, an authorization token, a payment token, etc. used for checkout and other transaction processing. The debug id may begin with a standard id which is used to represent and application home screen and is dynamically updated as a user navigates through the application. Alternatively, a unique debug id may be assigned for each site, option, and interaction had by a user on the application. This debug id may then be updated as the user reaches the various options. Still as another alternative option is the appendage of the unique debug ids such that a user's interactions (including, preferences, account information, shopping cart items, options selected, route followed through the stack, etc.) are tracked and may be retrieved if an error is encountered. The debug id and token may be created to form a string which includes letters, numbers, symbols, spaces, and the like. In one exemplary embodiment, the string may be in the following format: EC-1234ASFASFSFEEEFF #101212. Alternatively, the string may be a series of dots a combination of figures, patterns, etc.

Once the debug id and optionally the token string are generated, process 600 proceeds to operation 606 where the string is converted to a pattern which could be mapped and used to generate the embedded barcode. For example, in one embodiment, the string may be converted into a binary code. For the conversion, a color palette may be used wherein a different color may be used to represent the symbols, letters, or number on the string. For the conversion, the use of each color may be represented to represent one of three states. Such states can include the use of the particular color by on, off, or none. Thus, each portion of the captured string can be encoded into a message using the colors in one of the three states and thus can represent the entire string and converted into the binary scheme. Therefore, in the conversion scheme, for example, on may be mapped to 1, off to a 0, and none to an empty slot. Consequently, the 1's and O's are mapped to the on and off colors (e.g., 0100110011001100 01010101 00110011) as indicated by the color palette. Next, at operation 608, the barcode is created using the corresponding color palette using the three states designated above as they map to the use of the color in the form of geometric patterns to create the barcode.

At operation 610, a decision is made as to whether further interactions have occurred at the application. That is to say, process 600 can check to see if other options been selected, preferences set, funding instruments (and corresponding tokens) selected, sites visited, transactions initiated, checkout process requested, etc. Additionally, at operation 610, the system and process 600 may check for has an error occurred, screen frozen, bug encountered, or other application malfunction which would cause further interactions to halt. Thus, if the decision is made that indeed new application interactions exist, then process 600 continues to operation 612 where an updated debug id and token is obtained. As indicated, the updated debug id may be obtained via predefined identification codes, dynamically updated code, aggregate code, etc. which may be used to traverse the user's interactions with the application.

Alternatively, if at operation 610, no updates or changes are encountered, then the barcode generated at operation 608 is embedded into the user interface in a discrete, unobtrusive, and embedded manner. In some embodiments, the barcode is embedded and updated in real-time such that as an interaction occurs, change, error, etc., the barcode is similarly updated. Further, as previously indicated, although the use of a barcode is described herein, other forms, shapes, and other visual representation may be used to track and provided for debug.

Note that FIG. 6 provides an exemplary method for generating an unobtrusive and discretely embedded barcode which may be used for debugging. However, more or less operations may be used as well as gestures, movements, and methods for change and interaction tracking on an application.

Figure 7:
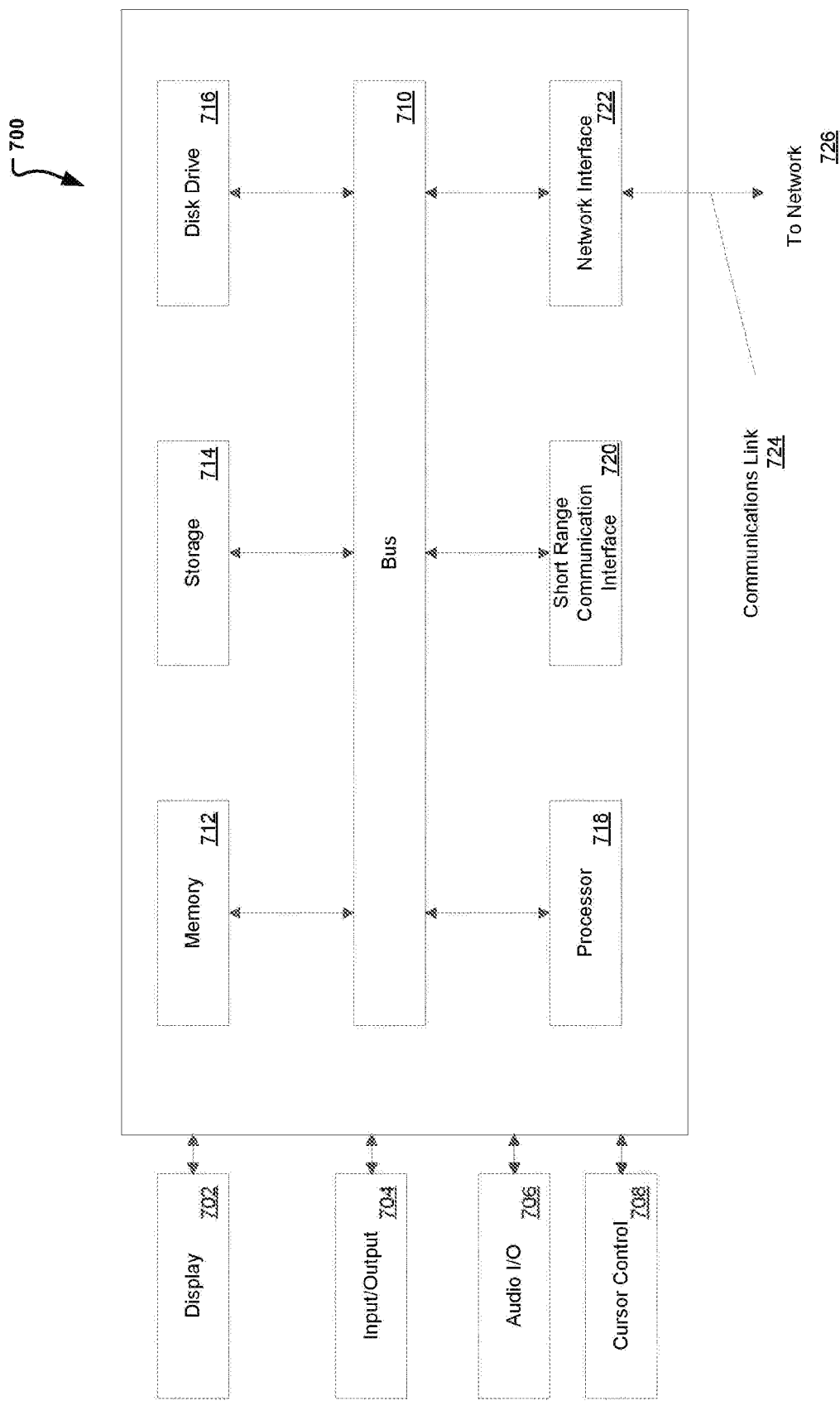
FIG. 7 illustrates an example block diagram of a computer system suitable for implementing one or more devices of the communication systems of FIGS. 1-6.

FIG. 7 illustrates an example computer system 700 in block diagram format suitable for implementing on one or more devices of the system in FIGS. 1-6. In various implementations, a device that includes computer system 700 may comprise a personal computing device (e.g., a smart or mobile device, a computing tablet, a personal computer, laptop, wearable device, PDA, etc.) that is capable of communicating with a network 726 (e.g., network 250). A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. 1/0 component 704 may also include an output component, such as a display 702 and a cursor control 708 (such as a keyboard, keypad, mouse, touchscreen, etc.). In some examples, 1/0 component 704 other devices, such as another user device, a merchant server, an email server, application service provider, web server, a payment provider server, an ATM server, and/or other servers via a network. In various embodiments, such as for many cellular telephone and other mobile device embodiments, this transmission may be wireless, although other transmission mediums and methods may also be suitable. A processor 718, which may be a microcontroller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination). Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short-range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other devices (e.g., user device 102, personal device 104, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short-range communications protocol, such as WiFi, and join the local area network. In some examples, computer system 700 may discover and/or communicate with other devices that are a part of the local area network using short range communications interface 820. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising
a non-transitory memory storing instructions;
one or more hardware processors coupled to the non-transitory memory and configured to read the instructions from the non-transitory memory to cause the system to perform operations comprising:
    in response to receiving an indication that a user device has changed to a first state, collecting information related to interactions with an application on the user device;
    generating a token associated with a transaction, wherein the interactions with the application include a processing of the transaction based on the token;
    generating a debug identification number corresponding to the first state of the application;
    generating, based in part on the debug identification number, an image used to represent the first state of the application; and
    embedding the image on a user interface of the application.

2. The system of claim 1, wherein the operations further comprise:
    converting the debug identification number into a binary pattern, wherein the binary pattern maps to a color scheme and wherein the image generated is also based in part on the color scheme.

3. The system of claim 1, wherein the operations further comprise:
    receiving an indication that the user device has changed to a second state;
    collecting the information related to new interactions with the application on the user device;
    generating an updated image based in part on the second state of the application; and
    embedding the updated image on the user interface of the application.

4. The system of claim 3, wherein the operations further comprise:
  determining no further interactions have occurred with the application;
  analyzing the new interactions to determine if a malfunction in the application has occurred; and
  debugging the malfunction using the updated image.

5. The system of claim 4, wherein debugging the malfunction includes generating a new debug identification number that represents aggregate interactions with the application.

6. The system of claim 4, wherein analyzing includes decoding, using a decoder application, data captured in the updated image.

7. A method, comprising:
  in response to receiving an indication that a user device has changed to a first state, collecting information related to interactions with an application on the user device;
  generating, a token associated with a transaction, wherein the interactions with the application include a processing of the transaction based on the token;
  generating a debug identification number corresponding to the first state of the application;
  generating, based in part on the debug identification number, an image used to represent the first state of the application; and
  embedding the image on a user interface of the application.

8. The method of claim 7, further comprising:
  converting the debug identification number into a binary pattern, wherein the binary pattern maps to a color scheme and wherein the image generated is also based in part on the color scheme.

9. The method of claim 7, further comprising:
  receiving an indication that the user device has changed to a second state;
  collecting the information related to new interactions with the application on the user device;
  generating an updated image based in part on the second state of the application; and
  embedding the updated image on the user interface of the application.

10. The method of claim 9, further comprising:
  determining no further interactions have occurred with the application;
  analyzing the new interactions to determine if a malfunction in the application has occurred; and
  debugging the malfunction using the updated image.

11. The method of claim 10, wherein debugging the malfunction includes generating a new debug identification number that represents aggregate interactions with the application.

12. The method of claim 10, wherein analyzing includes decoding, using a decoder application, data captured in the updated image.

13. A non-transitory machine-readable medium having stored thereon machine-readable instructions executable to cause a machine to perform operations comprising:
  in response to receiving an indication that a user device has changed to a first state, collecting information related to interactions with an application on the user device;
  generating, a token associated with a transaction, wherein the interactions with the application include a processing of the transaction based on the token;
  generating a debug identification number corresponding to the first state of the application;
  generating, based in part on the debug identification number, an image used to represent the first state of the application; and
  embedding the image on a user interface of the application.

14. The non-transitory machine-readable medium of claim 13, wherein the operations further comprise:
  converting the debug identification number into a binary pattern, wherein the binary pattern maps to a color scheme and wherein the image generated is also based in part on the color scheme.

15. The non-transitory machine-readable medium of claim 13, wherein the operations further comprise:
  receiving an indication that the user device has changed to a second state;
  collecting the information related to new interactions with the application on the user device;
  generating an updated image based in part on the second state of the application; and
  embedding the updated image on the user interface of the application.

16. The non-transitory machine-readable medium of claim 15, wherein the operations further comprise:
  determining no further interactions have occurred with the application;
  analyzing the new interactions to determine if a malfunction in the application has occurred; and
  debugging the malfunction using the updated image.

17. The non-transitory machine-readable medium of claim 16, wherein debugging the malfunction includes generating a new debug identification number that represents aggregate interactions with the application.

* * * * *